(12) United States Patent
Lau et al.

(10) Patent No.: US 10,902,026 B2
(45) Date of Patent: Jan. 26, 2021

(54) BLOCK CLASSIFIED TERM

(71) Applicant: LONGSAND LIMITED, Cambridge (GB)

(72) Inventors: Daniel Lau, Cambridge (GB); Lewis Mackay, Cambridge (GB); Daniel Timms, Cambridge (GB)

(73) Assignee: LONGSAND LIMITED, Cambridgeshire (GB)

( * ) Notice: Subject to any disclaimer, the term of this patent is extended or adjusted under 35 U.S.C. 154(b) by 696 days.

(21) Appl. No.: 15/524,122

(22) PCT Filed: Nov. 27, 2014

(86) PCT No.: PCT/EP2014/075782
§ 371 (c)(1),
(2) Date: May 3, 2017

(87) PCT Pub. No.: WO2016/082877
PCT Pub. Date: Jun. 2, 2016

(65) Prior Publication Data
US 2017/0323004 A1 Nov. 9, 2017

(51) Int. Cl.
*G06N 20/00* (2019.01)
*G06F 16/28* (2019.01)
(Continued)

(52) U.S. Cl.
CPC ...... *G06F 16/285* (2019.01); *G06F 16/90324* (2019.01); *G06F 16/951* (2019.01);
(Continued)

(58) Field of Classification Search
CPC ........ G06N 20/00; G06N 5/003; G06N 7/005; G06N 20/10; G06N 5/022; G06N 5/04; G06N 3/006; G06N 3/0454; G06N 5/027; G06N 5/043; G06N 5/046; G06F 16/285; G06F 16/90324; G06F 16/951
See application file for complete search history.

(56) References Cited

U.S. PATENT DOCUMENTS 7,802,194 B2   9/2010 Kol et al.
7,809,714 B1 * 10/2010 Smith ................. G06F 16/2425
                                                                707/713
(Continued)

FOREIGN PATENT DOCUMENTS

| | | |
|---|---|---|
| CN | 101281521 | 10/2008 |
| CN | 102572092 | 7/2012 |

(Continued)

OTHER PUBLICATIONS

Nicholas Diakopoulous, "Sex, Violence, and Auotcomplete Algorithms", Aug. 2, 2013, pp. 1-4.(website: https://slate.com/technology/2013/08/words-banned-from-bing-and-googles-autocomplete-algorithms.html) (Year: 2013).*

(Continued)

*Primary Examiner* — Paulinho E Smith

(57) ABSTRACT

A class may be determined of a term from a database. The term may be blocked from being presented to a user, if the determined class does not include a permission for the user to view the term. The term may suggest a remainder of an incomplete query input by the user.

18 Claims, 2 Drawing Sheets

(51) Int. Cl.
*G06F 16/951* (2019.01)
*G06F 16/9032* (2019.01)
*G06N 5/04* (2006.01)
*G06N 7/00* (2006.01)

(52) U.S. Cl.
CPC .............. *G06N 5/046* (2013.01); *G06N 7/005* (2013.01); *G06N 20/00* (2019.01)

(56) References Cited

U.S. PATENT DOCUMENTS

| | | | |
|---|---|---|---|
| 8,412,728 B1 | 4/2013 | Roskind | |
| 2003/0033288 A1 | 2/2003 | Shanahan | |
| 2009/0024590 A1 | 1/2009 | Sturge et al. | |
| 2009/0106178 A1* | 4/2009 | Chu | G06N 20/00 706/14 |
| 2011/0264681 A1 | 10/2011 | Kimberlin et al. | |
| 2014/0136543 A1* | 5/2014 | Frieden | G06F 16/90324 707/741 |
| 2016/0110657 A1* | 4/2016 | Gibiansky | G06N 20/00 706/12 |
| 2016/0253403 A1* | 9/2016 | Marin | G06F 16/283 707/605 |
| 2017/0177993 A1* | 6/2017 | Draelos | G06N 3/0454 |
| 2018/0018585 A1* | 1/2018 | Marin | G06N 20/00 |

FOREIGN PATENT DOCUMENTS

| | | |
|---|---|---|
| CN | 103441986 | 12/2013 |
| CN | 103646109 | 3/2014 |
| JP | 2009-116680 A | 5/2009 |
| WO | WO-201412748 | 11/2014 |

OTHER PUBLICATIONS

Shmuel Brody, "Cluster-Based Pattern Recognition in Natural Language Text", Aug. 2005, pp. 1-87 (Year: 2005).*
International Search Report and Written Opinion; PCT/EP2014/075782; dated Aug. 26, 2015; 9 pages.
SEER*DMS User Manual, "Chapter 20: Searching for Records and Patients", Jun. 25, 2011, 16 pages.

* cited by examiner

BLOCK CLASSIFIED TERM

CLAIM FOR PRIORITY

The present application is a national stage filing under 35 U.S.C. § 371 of PCT application number PCT/EP2014/075782, having an international filing date of Nov. 27, 2014, the disclosure of which is hereby incorporated by reference in its entirety.

BACKGROUND

Device or systems may provide a feature called autocomplete, or word completion. Autocomplete may involve the device or system predicting a word or phrase that the user wants to type in without the user actually typing it in completely. Manufacturers, vendors, and/or service providers are challenged to provide improved autocomplete technologies to better assist the user.

BRIEF DESCRIPTION OF THE DRAWINGS

The following detailed description references the drawings, wherein.

DETAILED DESCRIPTION

Specific details are given in the following description to provide a thorough understanding of embodiments. However, it will be understood that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

Auto-completion dialogues may provide a user with suggestions from fragments of input text. For example "capit" may be auto-completed to "capital" or "capitulate." Auto-completion may be implemented through, for example, web browsers, e-mail programs, search engine interfaces, source code editors, database query tools, word processors, and command line interpreters.

Some implementations may use either a dictionary or search engine. The search engine may only provide suggestions that return relevant items indexed into the search engine, as opposed to a dictionary where some entries may not be present. However, in some scenarios the indexed data may include sensitive information. For example, a search index of medical records could contain patient names or their social security numbers. Auto-completing sensitive information may be undesirable whilst completing non-sensitive information is beneficial to the search operator.

Filtering data using only weighting or some popularity/threshold parameter (number of documents containing terms), may not provide fine enough control to prevent leaking of sensitive information. Further, providing explicit blacklists for suggestions may filter out exact term matches. However, manually providing and/or updating such a level of fine control may be cost-prohibitive, to the point where it is unlikely to be usefully applied.

Examples may use classification technology to filter autocomplete suggestions so that users are presented only with information they are permitted to see. An example device may determine a class a term from a database. The device may block the term from being presented to a user, if the determined class does not include a permission for the user to view the term. The term may suggest a remainder of an incomplete query input by the user.

Thus, examples may allow for finer control over what elements are filtered compared to simple weight/threshold parameters. Further, examples may allow for faster deployment and less maintenance compared to a manually maintained blacklist or whitelist of exact terms/phrases/entries.

Figure 1:
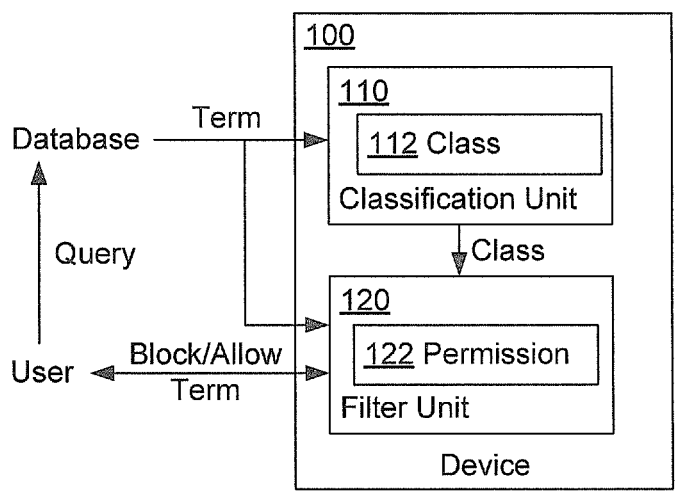
FIG. 1 is an example block diagram of a device to block a term from being presented to a user.

Referring now to the drawings, FIG. 1 is an example block diagram of a device 100 to block a term from being presented to a user. The device 100 may be a microprocessor, a controller, a memory module or device, a notebook computer, a desktop computer, an all-in-one system, a server, a network device, a wireless device, or any other type of device capable of interacting with a database and/or intercepting a message along a network.

The device 100 is shown to include a classification unit 110 and a filter unit 120. The classification and filter units 110 and 120 may include, for example, a hardware device including electronic circuitry for implementing the functionality described below, such as control logic and/or memory. In addition or as an alternative, the classification and filter units 110 and 120 may be implemented as a series of instructions encoded on a machine-readable storage medium and executable by a processor.

The classification unit 110 may determine a class 112 of a term from a database. The term may be a word or phrase used to describe a thing or to express a concept, such as a name, an address, and a social security number, and the like. The term may suggest a remainder of an incomplete query input by the user. The class 112 may relate to a system for identifying various types of terms, such as confidential and non-confidential terms.

The filter unit 120 may block a term from being presented to a user, if the determined class 112 does not include a permission 122 for the user to view the term. For instance, the determined class 112 may indicate at least one of sensitive and personally identifiable information, if the determined class 112 does not include permission 122 for the user to view the term. The filter unit 120 may allow the term to be presented to the user, if the determined class 112 includes the permission 122 for the user to view the term.

The user may be any person who is entering a query, such as by using a computer or network service, for which the database may autocomplete with the term. The user may have a user account and/or be identified by a user name and/or password. The permission 122 may relate to the whether the user has a right to view, access or modify the term. The permission 122 here may relate to whether the user may view the term triggered by the database in response to the user's query.

For instance, if the user does not have permission to view the term based on the class 112 of the term, the filter unit 120 may block the term by preventing the term from being sent to the user and/or denying access to the term. The determined class 112 may be stored and/or associated with the term at the database, the classification unit 110 and/or the filter unit 120, such as via metadata. The classification and filter units 110 and 120 are explained in greater detail below with respect to FIG. 2.

Figure 2:
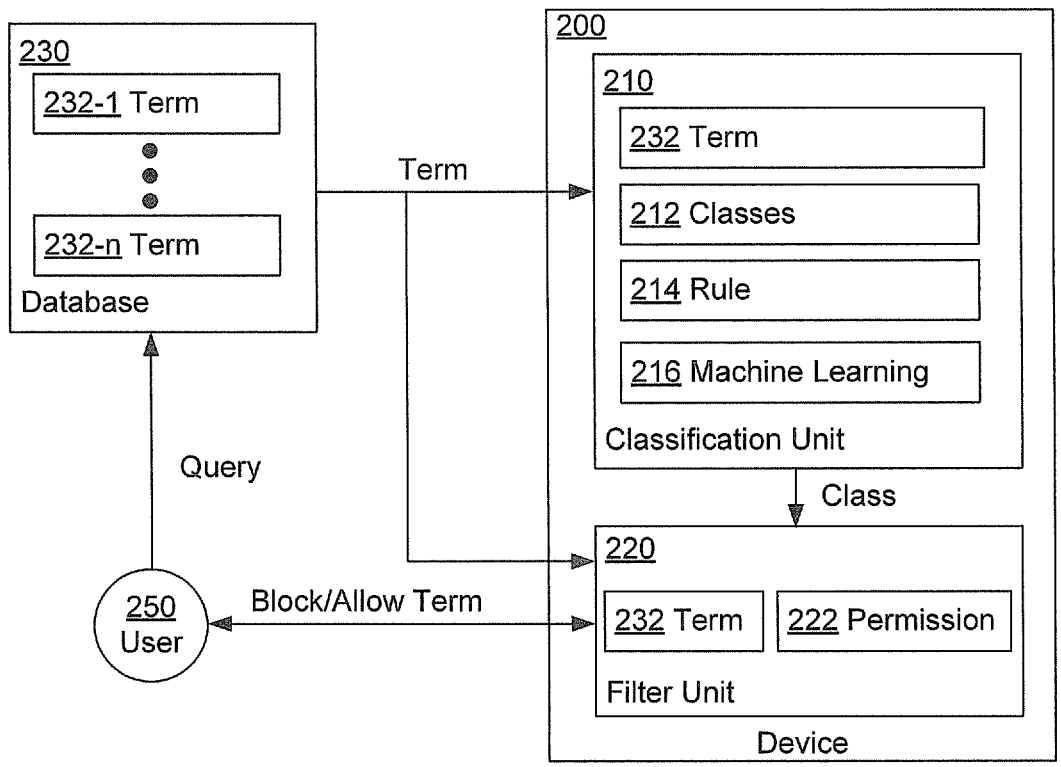
FIG. 2 is another example block diagram of a device to block a term from being presented to a user.

FIG. 2 is another example block diagram of a device 200 to block a term from being presented to a user. The device 200 may be a microprocessor, a controller, a memory module or device, a notebook computer, a desktop computer, an all-in-one system, a server, a network device, a wireless device, or any other type of device capable of interacting with a database and/or intercepting a message along a network.

The device 200 is shown to interface with a database 230. The database 230 may be any electronic, magnetic, optical, or other physical storage device that contains or stores information, such as Random Access Memory (RAM), an Electrically Erasable Programmable Read-Only Memory (EEPROM), a storage drive, a Compact Disc Read Only Memory (CD-ROM), and the like. For instance, the database 230 may include the most popular search terms 232-1 to 232-n, where n is a natural number, indexed from a search engine. Further, at least some of the search terms 232-1 to 232-n, may include personally identifiable information (PII), such as medical records, names, social security numbers and the like.

The device 200 of FIG. 2 may include at least the functionality and/or hardware of the device 100 of FIG. 1. For example, a classification unit 210 of the device 200 of FIG. 2 may include at least the functionality and/or hardware of the classification unit 110 of the device 100 of FIG. 1 and a filter unit 220 of the device 200 of FIG. 2 may include at least the functionality and/or hardware of the classification unit 120 of the device 100 of FIG. 1.

As noted above, the classification unit 210 may determine a class 212 of a term 232 from the database 230. The class 212 of the term 232 may vary with respect to the user 250. For example, the term 232 may be classified as confidential with respect to a first user but classified as non-confidential with respect to a second user. Thus, the classification unit 210 may take into account a type or identify of the user 250 when determining the class 212 of the term 232. Different types of the users 250 may correspond to different types of classes 212. For instance, the user's 250 account may be used to identify the type of user, such as when the user 250 logs into a system.

As also noted above, the filter unit 220 may block a term from being presented to a user 250, if the determined class 212 does not include a permission 222 for the user 250 to view the term 232. The filter unit 220 may allow the term 232 to be presented to the user 250, if the determined class 212 includes the permission 222 for the user 250 to view the term 232.

The classification unit 210 may classify the term 232 based on at least one of a rule 214 and machine learning 216. While one rule 214 is shown, examples may include a plurality of rules. The rule 214 may indicate an operation to be performed on a number, letter, grammar, punctuation and/or syntax of the term 232. The classification unit 210 may use the rule 214 to match the term 232 to at least one of a template and a pattern. For example, the classification unit 210 may use a rule to classify a term 232 as a social security number, if the term 232 matches a particular pattern for a social security number, as indicated by the rule 214. The filter unit 220 may block the term 232 from being presented to the user 250, if the term 232 is classified as a social security number.

In another example, the classification unit 210 may perform an arithmetic operation on the term 232. In turn, the filter unit 220 may allow the term to be presented to the user 250, if a result of the arithmetic operation satisfies the rule 214. For instance, the classification unit 210 may classify the term 232 as a credit card number upon a result of a checksum or multiplication of the digits of the credit card or instead classify the term 232 as a date upon comparing a range and/or syntax of the term 232 to a template. Here, the filter unit 220 may block the term 232 from being presented to the user 250, if the term 232 is classified as a credit card number or a date that falls on prohibited day.

Machine learning 216 may relate to a construction and study of algorithms that can learn from data. Such algorithms may operate by building a model based on inputs and using that to make predictions or decisions, rather than following only explicitly programmed instructions. Machine learning 216 techniques may include, for example, grammar induction and/or a probabilistic classifier. For instance, the probabilistic classifier may be a Bayesian classifier. Grammar induction may include, for example, inference by trial-and-error, a genetic algorithm, a greedy algorithm, a distributional learning algorithm and a pattern learning algorithm. The classification unit 210 may use machine learning to classify types of terms 232 that may not be easily identifiable via a rule 214, such as addresses or spam.

As noted above, the classification unit 210 may determine a plurality of the different types of classes 212, based on the plurality of terms 232-1 to 232-n included in the database 230. The types of classes 212 may relate to different security clearances. Further, at least one of the classes 212 may be a subset of another of the classes 212. Thus, the filter unit 220 may compare to an identify of the user 250 to class 212 of the term 232 determine, if the user's security clearance only allows them to see a subset of the terms 232. If the user 240 does have not security clearance, the filer unit 220 may not provide the term 232 to the user 250, which was suggested by the database in response to the user's 250 query.

The classification unit 210 may determine a plurality of the classes 212 of the terms 232 simultaneously. Similarly, the filter unit 220 may block and/or allow a plurality of the terms 232 simultaneously. Thus, examples may remove or prevent terms 232 from being suggested to the user 250 that are classified as not to be presented to the user 250. Further, PII is just one example of a type classification that could be filtered upon by the filter unit 220. Examples may determine a class 212 of a term 232, based on any type of criteria deemed appropriate for denying to the term 232.

Figure 3:
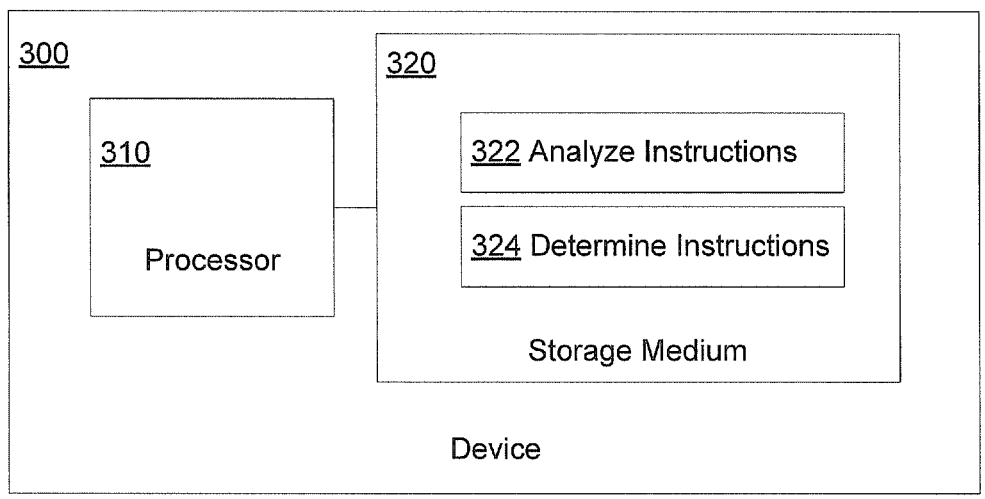
FIG. 3 is an example block diagram of a computing device including instructions for blocking a term based on a class of the term.

FIG. 3 is an example block diagram of a computing device 300 including instructions for blocking a term based on a class of the term. In the embodiment of FIG. 3, the computing device 300 includes a processor 310 and a machine-readable storage medium 320. The machine-readable storage medium 320 further includes instructions 322 and 324 for blocking the term based on the class of the term.

The computing device 300 may be included in or part of, for example, a microprocessor, a controller, a memory module or device, a notebook computer, a desktop computer, an all-in-one system, a server, a network device, a wireless device, or any other type of device capable of executing the instructions 322 and 324. In certain examples, the computing device 300 may include or be connected to additional components such as memories, controllers, etc.

The processor 310 may be, at least one central processing unit (CPU), at least one semiconductor-based microprocessor, at least one graphics processing unit (GPU), a microcontroller, special purpose logic hardware controlled by microcode or other hardware devices suitable for retrieval and execution of instructions stored in the machine-readable storage medium 320, or combinations thereof. The processor 310 may fetch, decode, and execute instructions 321, 323, 325, 327 and 329 to implement blocking the term based on the class of the term. As an alternative or in addition to retrieving and executing instructions, the processor 310 may include at least one integrated circuit (IC), other control logic, other electronic circuits, or combinations thereof that include a number of electronic components for performing the functionality of instructions 322 and 324.

The machine-readable storage medium 320 may be any electronic, magnetic, optical, or other physical storage device that contains or stores executable instructions. Thus, the machine-readable storage medium 320 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 320 can be non-transitory. As described in detail below, machine-readable storage medium 320 may be encoded with a series of executable instructions for blocking the term based on the class of the term.

Figure 4:
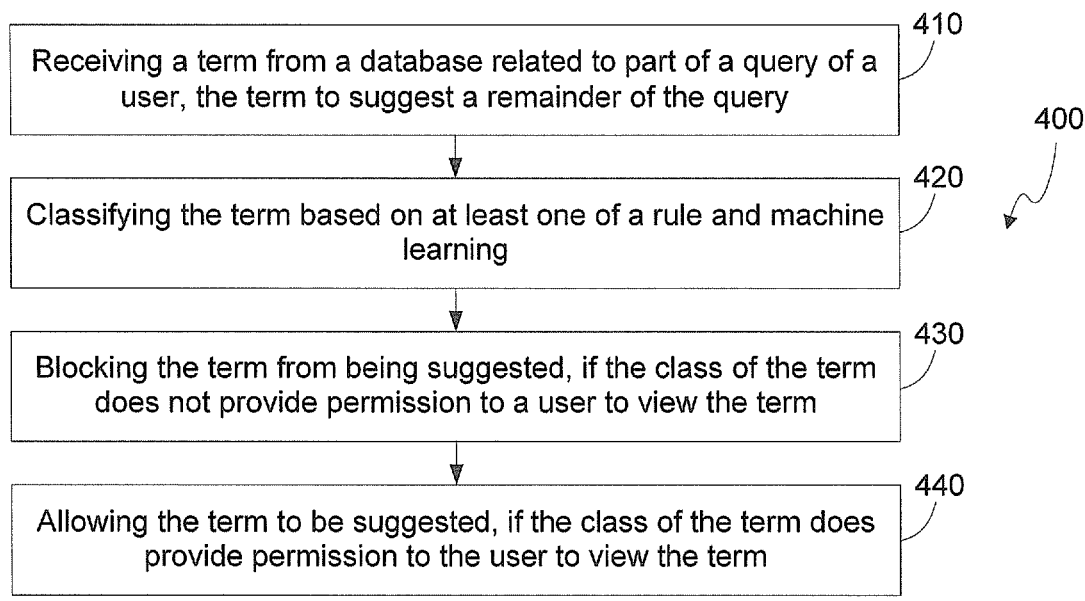
FIG. 4 is an example flowchart of a method for blocking a term based on a class of the term.

Moreover, the instructions 322 and 324, when executed by a processor (e.g., via one processing element or multiple processing elements of the processor) can cause the processor to perform processes, such as, the process of FIG. 4. For example, the analyze instructions 322 may be executed by the processor 310 to analyze a term from a database (not shown) to determine a class, the term is to relate to part of a query and to suggest a remainder of the query. The determine instructions 324 may be executed by the processor 310 to determine if the term is to be blocked in response to the query, based on the class of the analyzed term. The class may be determined based on at least one of a rule and machine learning. For example, the term may be blocked from being presented, if a user does not have permission to the analyzed class. The term may be allowed to be presented, if the user, if the user has permission to the analyzed class.

FIG. 4 is an example flowchart 400 of a method for blocking a term based on a class of the term. Although execution of the method 400 is described below with reference to the device 200, other suitable components for execution of the method 400 can be utilized, such as the device 100. Additionally, the components for executing the method 400 may be spread among multiple devices (e.g., a processing device in communication with input and output devices). In certain scenarios, multiple devices acting in coordination can be considered a single device to perform the method 400. The method 400 may be implemented in the form of executable instructions stored on a machine-readable storage medium, such as storage medium 320, and/or in the form of electronic circuitry.

At block 410, the device 200 receives a term 232 from a database 230 related to part of a query of a user 250. The term 232 may suggest a remainder of the query. At block 420, the device 200 may classify the term based on at least one of a rule 214 and machine learning 216. The machine learning 216 may include at least one of grammar induction and a probabilistic classifier to classify the term 232. The rule 214 may match the term to at least one of a template and a pattern to classify the term 232.

At block 430, the device 200 blocks the term 232 from being suggested, if the class 212 of the term 232 does not provide permission 222 to a user 250 to view the term 232. At block 440, the device 200 allows the term to be suggested, if the class 212 of the term 232 does provide permission 222 to the user 250 to view the term 232.

We claim:

1. A device, comprising:
a processor; and
a non-transitory computer-readable storage medium on which is stored instructions that, when executed by the processor, cause the processor to:
determine a class of a term received from a database based on a rule and/or machine learning, wherein the rule is used to match the term to a template and/or a pattern;
perform an arithmetic operation on the term, wherein the arithmetic operation is a checksum or a multiplication of a plurality of digits included in the term;
determine the class of the term based on a result of the arithmetic operation satisfying the rule, wherein the term is to suggest a remainder of an incomplete query; and
block the term from being presented to a user based on the determined class of the term not providing a permission for the user to view the term, or
allow the term to be presented based on the class of the term providing the permission for the user to view the term.

2. The device of claim 1, wherein the instructions cause the processor to:
classify the term based on the machine learning, and
the machine learning includes a grammar induction and/or a probabilistic classifier.

3. The device of claim 2, wherein,
the probabilistic classifier includes a Bayesian classifier; and
the grammar induction includes an inference by trial-and-error, a genetic algorithm, a greedy algorithm, a distributional learning algorithm, and/or a pattern learning algorithm.

4. The device of claim 1, wherein the instructions cause the processor to:
classify the term based on the rule, wherein
the rule indicates an operation to be performed on a number, letters, and/or a syntax of the term.

5. The device of claim 1, wherein
different types of users correspond to different types of classes.

6. The device of claim 5, wherein the instructions cause the processor to:
determine a plurality of the different types of classes based on a plurality of terms included in the database, wherein
the plurality of terms included in the database are mined from data indexed into a search engine.

7. The device of claim 6, wherein,
the plurality of the different types of classes relate to different security clearances, and
one of the plurality of the different types of classes is a subset of another of the plurality of the different types of classes.

8. The device of claim 1, wherein,
the term includes a name, an address, and/or a social security number, and
the class of the term indicates sensitive and/or personally identifiable information when the class of the term does not include the permission for the user to view the term.

9. The device of claim 1, wherein the instructions cause the processor to:

determine a plurality of classes of terms simultaneously, and block and/or allow a plurality of terms simultaneously.

10. The device of claim 1, wherein the instructions cause the processor to:

classify the class of the term as a date based on a comparison of a range and/or a syntax of the term to the template and/or the pattern.

11. A method, comprising:

receiving a term from a database related to part of a query of a user, the term to suggest a remainder of the query;

classifying the term based on a rule and/or machine learning;

performing an arithmetic operation on the term, wherein the arithmetic operation is a checksum or a multiplication of a plurality of digits included in the term;

determining the class of the term based on a result of the arithmetic operation satisfying the rule;

blocking the term from being suggested based on the class of the term not providing a permission to the user to view the term; or allowing the term to be suggested based on the class of the term providing the permission to the user to view the term.

12. The method of claim 11, wherein, the machine learning includes a grammar induction and/or a probabilistic classifier to classify the term, and the rule is to match the term to a template and/or a pattern to classify the term.

13. The method of claim 11, further comprising:

determining a plurality of classes of terms simultaneously; and blocking and/or allowing a plurality of terms simultaneously.

14. A non-transitory computer-readable storage medium storing instructions that, when executed by a processor of a device, cause the processor to:

analyze terms received from a database to determine a plurality of classes of the terms, the terms relating to a part of a query and to suggest a remainder of the query;

perform an arithmetic operation on the terms, the arithmetic operation being a checksum or a multiplication of a plurality of digits included in the terms;

determine the plurality of classes of the terms based on a result of the arithmetic operation satisfying a rule; and determine whether a plurality of the terms are to be blocked and/or allowed in response to the query based on the plurality of classes of the terms.

15. The non-transitory computer-readable storage medium of claim 14, wherein the instructions cause the processor to:

block the plurality of the terms from being presented based on a user not having a permission to the plurality of classes of the terms, and allow the plurality of the terms to be presented, based on the user having the permission to the plurality of classes of the terms.

16. The non-transitory computer-readable storage medium of claim 14, wherein the instructions cause the processor to:

match the terms to a template and/or a pattern based on the rule.

17. The non-transitory computer-readable storage medium of claim 14, wherein the instructions cause the processor to:

determine the plurality of classes of the terms simultaneously, and block and/or allow the plurality of the terms simultaneously.

18. The non-transitory computer-readable storage medium of claim 14, wherein the instructions cause the processor to:

determine the plurality of classes of the terms based on the rule and machine learning.

\* \* \* \* \*